Patented July 3, 1934

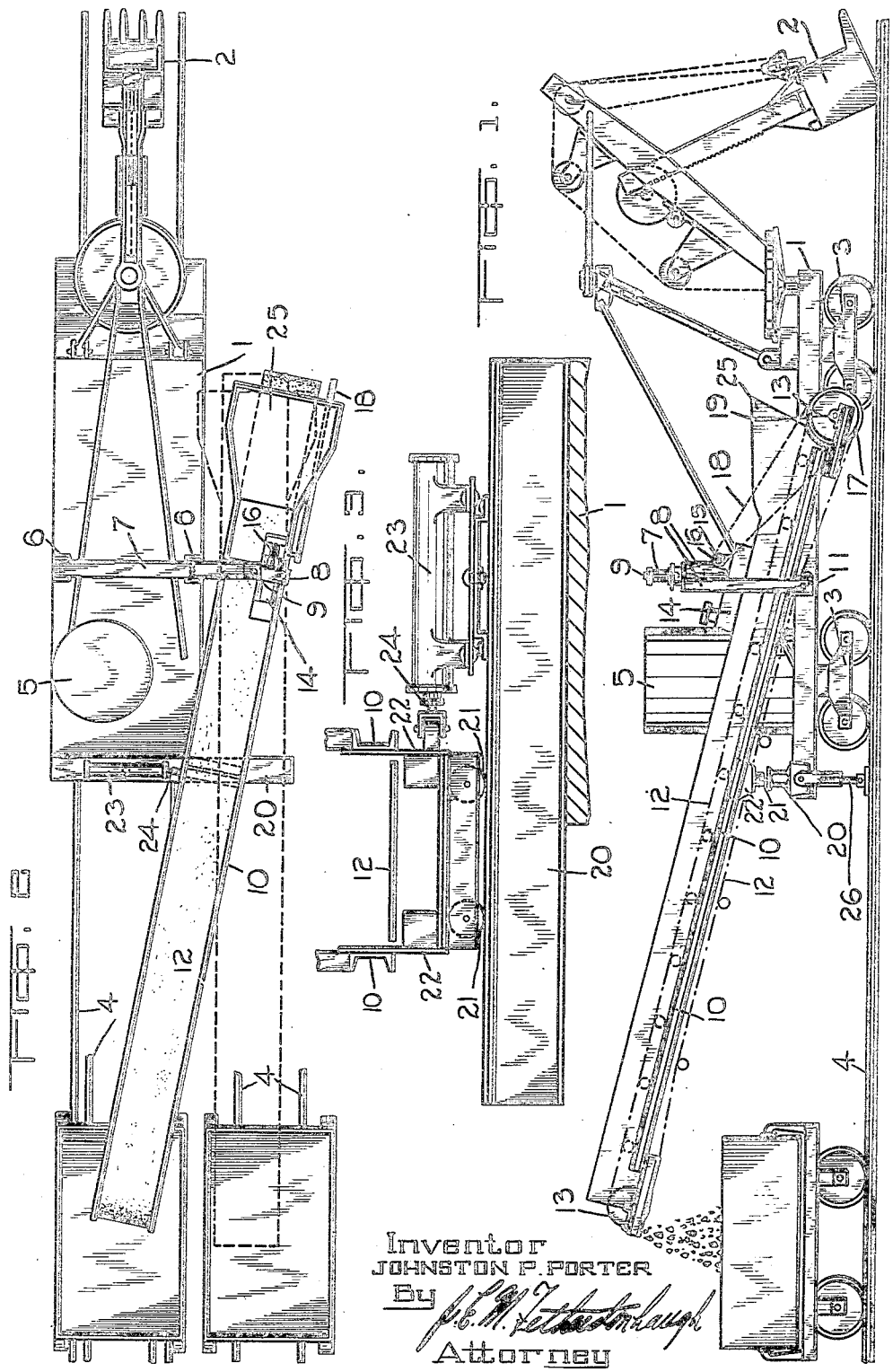

1,965,000

UNITED STATES PATENT OFFICE 1,965,000

CONVEYER ATTACHMENT FOR TUNNEL SHOVELS

Johnston Pugsley Porter, St. Catherines, Ontario, Canada

Application April 12, 1933, Serial No. 665,623

6 Claims. (Cl. 198—233)

My invention relates to improvements in conveyer attachments for tunnel shovels, and the object of the invention is to provide a conveyer attachment so located and disposed with respect to the shovel that the arc of swing of the latter can be reduced in dumping the contents thereof in comparison to that necessary to dump the contents of the shovel directly into a dump cart or truck thus effecting a considerable saving of time in the excavating operation carried out by the shovel.

A further object is to construct an apparatus in which the excavated material can be transferred to a greater number of dump carts or trucks than is possible where my conveyer attachment is not employed thus facilitating the removal of the material.

With the above and other objects in view which will hereinafter appear, my invention consists, in its preferred embodiment, of the construction all as hereinafter more particularly described and illustrated in the accompanying drawing in which:—

Fig. 1 represents a side elevation of the apparatus constructed according to my invention.

Fig. 2 is a plan view thereof, and

Fig. 3 is an enlarged vertical cross-sectional view through my conveyer showing the mounting of the same and the means for swinging it.

Like characters of reference indicate corresponding parts in the different views.

The under-frame 1 of the shovel 2 is mounted on trucks 3 which are adapted to run on the track 4 situated in the tunnel. The shovel which is preferably of the Bucyrus type is, as illustrated, adapted to be actuated by compressed air from the air receiver 5. The pipe and other connections incidental to the actuating of the shovel by the air have not been shown as they form no part of the present invention.

Upright members 6 are secured to the under-frame 1 of the shovel intermediately of the length of the latter, and a transverse member 7 is secured to the top of the members 6 having one end protruding laterally of the shovel under-frame 1. To this protruding end a saddle 8 is attached by a pin 9 and the legs of the saddle are secured to the frame 10 of the conveyer by means of a cross bolt 11. Thus the saddle and the attached conveyer are capable of being swung laterally as indicated in Fig. 1.

A belt 12 or other similar conveyer element extends over drums or pulleys 13 journalled at the ends of the frame 10, and the conveyer belt is driven by means of a compressed air engine 14 mounted on the frame 10 through the medium of a sprocket 15 on the engine shaft 16 connected to a sprocket 17 by the chain 18, the sprocket 17 being secured to the shaft 19 to which one of the drums or pulleys 13 is secured.

A cross bar 20 is secured to the under-frame 1 and one end protrudes laterally thereof. The upper surface of the cross bar constitutes a track upon which rollers 21 journalled to gussets 22 depending from the conveyer frame 10 are adapted to run.

A compressed air operated ram 23 is pivotally mounted on the cross bar 20 having its plunger 24 pivotally connected to one of the gussets 22.

A feed hopper 25 is provided above the end of the conveyer frame adjacent to the shovel 2 for receiving the material dumped onto the conveyer therefrom and a swing jack 26 is provided attached under the protruding end of the cross bar 20 to steady the beam when the conveyer is in operation.

The discharge end of the conveyer protrudes well beyond the adjacent end of the under-frame 1 to enable several dump trucks to be positioned below such conveyer. Consequently by the use of my conveyer, I can successively load a number of dump trucks on each dump truck track. For instance, as illustrated, where there are two dump truck tracks side by side I could load six trucks instead of only two in the case where the shovel is employed without my conveyer, it being understood that the conveyer is swung either to its full line position or to its dotted line position (Fig. 1) by means of the ram 23. Consequently the trucks on either track can be loaded.

Furthermore, in transferring the material from the excavation to the feed hopper of the conveyer the shovel 2 is swung through an arc considerably less than where my conveyer is not employed. As illustrated the arc would be in the neighborhood of 120°, and by mounting the conveyer so that the hopper end is closer to the shovel mechanism this arc could be further reduced. Where a shovel of the above type is employed to move the excavated earth direct to the trucks the shovel would have to be swung through an arc of substantially 180°. Therefore by utilizing my conveyer a considerable saving in time is effected.

From the above description it will be apparent that I have devised a simple and effective conveyer attachment for tunnel shovels which will considerably increase the speed with which a tunnel can be driven. Furthermore, I have constructed a device which can readily be dismantled for transport and assembled again for use.

What I claim as my invention is:

1. In a conveyer attachment for tunnel shovels, the combination with a shovel supporting carriage, of a raised supporting member on the carriage and extending outwardly from a side thereof, a depending saddle swingably mounted on the protruding end of the supporting member and capable of swinging in a horizontal plane, an endless conveyer mounted in the saddle, and anti-friction means between the carriage and the conveyer for supporting the latter in a rearwardly and upwardly inclined position so that it can swing laterally with its saddle.

2. In a conveyer attachment for tunnel shovels, the combination with a shovel supporting carriage, of a raised supporting member on the carriage and extending outwardly from a side thereof, a depending saddle swingably mounted on the protruding end of the supporting member and capable of swinging in a horizontal plane, an endless conveyer mounted in the saddle, a laterally extending track in the vicinity of the rear end of the carriage protruding from the side thereof upon which the conveyer is mounted, a depending bracket on the conveyer, and a roller journalled in the bracket and adapted to engage the track.

3. In a conveyer attachment for tunnel shovels, the combination with a shovel supporting carriage, of a raised supporting member on the carriage and extending outwardly from a side thereof, a depending saddle swingably mounted on the protruding end of the supporting member and capable of swinging in a horizontal plane, an endless conveyer mounted in the saddle, antifriction means between the carriage and the conveyer for supporting the latter in a rearwardly and upwardly inclined position so that it can swing laterally with its saddle, and means on the carriage for swinging the conveyer laterally.

4. In a conveyer attachment for tunnel shovels, the combination with a shovel supporting carriage, of a raised supporting member on the carriage and extending outwardly from a side thereof, a depending saddle swingably mounted on the protruding end of the supporting member and capable of swinging in a horizontal plane, an endless conveyer mounted in the saddle, a laterally extending track in the vicinity of the rear end of the carriage protruding from the side thereof upon which the conveyer is mounted, a depending bracket on the conveyer, a roller journalled in the bracket and adapted to engage the track, and a ram including a plunger swingably mounted on the lateral track, said plunger operatively connected to the conveyer.

5. In a conveyer attachment for tunnel shovels, the combination with a shovel supporting carriage, of a conveyer, horizontally swingable means extending laterally from the carriage and connected to the conveyer intermediately of the length of the latter for supporting the same clear of the carriage, and subsidiary supporting means for the conveyer located on the carriage below a point on the conveyer intermediate between the aforesaid horizontally swingable supporting means and the rear end of such conveyer, said subsidiary supporting means for the conveyer permitting lateral movement thereof.

6. In a conveyer attachment for tunnel shovels, the combination with a shovel supporting carriage, of a conveyer, a raised supporting member mounted on the carriage and extending laterally of a side thereof, a depending saddle horizontally swingably mounted on said raised supporting member, a conveyer connected intermediately of its length to said saddle, and subsidiary supporting means for the conveyer located on the carriage below a point on the conveyer intermediate between the saddle and its rear end, said subsidiary supporting means for the conveyer permitting lateral movement thereof.

JOHNSTON PUGSLEY PORTER.